United States Patent [19]

Redway

[11] Patent Number: 5,419,493
[45] Date of Patent: May 30, 1995

[54] AGRICULTURAL CHEMICAL DISTRIBUTOR

[76] Inventor: Graham J. Redway, P.O. Box 805, Berri SA 5343, Australia

[21] Appl. No.: 137,087
[22] PCT Filed: Feb. 11, 1993
[86] PCT No.: PCT/AU93/00059
§ 371 Date: Oct. 18, 1993
§ 102(e) Date: Oct. 18, 1993
[87] PCT Pub. No.: WO93/16589
PCT Pub. Date: Sep. 2, 1993

[30] Foreign Application Priority Data

Feb. 25, 1992 [AU] Australia .................. PL1054

[51] Int. Cl.⁶ .................... B05B 1/28; B05B 15/04
[52] U.S. Cl. .................... 239/172; 239/288.5
[58] Field of Search .............. 239/288–288.5, 239/169, 162, 172, 168, 165, 167, 175; 47/1.5, 1.7

[56] References Cited

U.S. PATENT DOCUMENTS

| | | | |
|---|---|---|---|
| 2,602,684 | 7/1952 | Pinke | 239/168 X |
| 2,619,379 | 11/1952 | Skifte | 239/168 |
| 2,986,388 | 5/1961 | Foster | 239/224 X |
| 4,186,879 | 2/1980 | Kinder | 239/172 |
| 4,199,896 | 4/1980 | Lehman | 47/1.7 |
| 4,596,287 | 5/1986 | Bleasdale et al. | 239/288.5 X |
| 5,139,200 | 8/1992 | Greimann et al. | 239/288.3 |
| 5,310,116 | 5/1994 | Broyhill | 239/288 X |

FOREIGN PATENT DOCUMENTS

| | | | |
|---|---|---|---|
| 141689 | 1/1950 | Australia | 239/162 |
| 4165285 | 10/1985 | Australia | |
| 6393890 | 4/1991 | Australia | |
| 587484 | 4/1947 | United Kingdom | 239/167 |
| 8500039 | 10/1985 | WIPO | |

OTHER PUBLICATIONS

Derwent Abstract No. 85-322300/51 (Gear Plants Protects) 15 Jun. 1985.
The Principles of CDA Spraying, Oct. 1983, CDA Ltd.

Primary Examiner—Andres Kashnikow
Assistant Examiner—Kevin P. Weldon
Attorney, Agent, or Firm—Watts, Hoffmann, Fisher & Heinke Co.

[57] ABSTRACT

An agricultural chemical liquid distributor is disclosed. The distributor has a shroud supported by a frame. The shroud delineates a chemical distributing space and a spray head is mounted in the space. The frame is attached to a vehicle for transport of the distributor as the spray head dispenses chemicals within the space. The shroud has a generally circular peripheral skirt of deformable material, and a bearing supports the shroud with respect to the frame for free rotation about a generally vertical axis. The shroud is of such size and configuration that passage of the distributor past an obstruction encountered by the skirt will cause radially inward deformation of said skirt and effect rotation of the shroud.

16 Claims, 3 Drawing Sheets

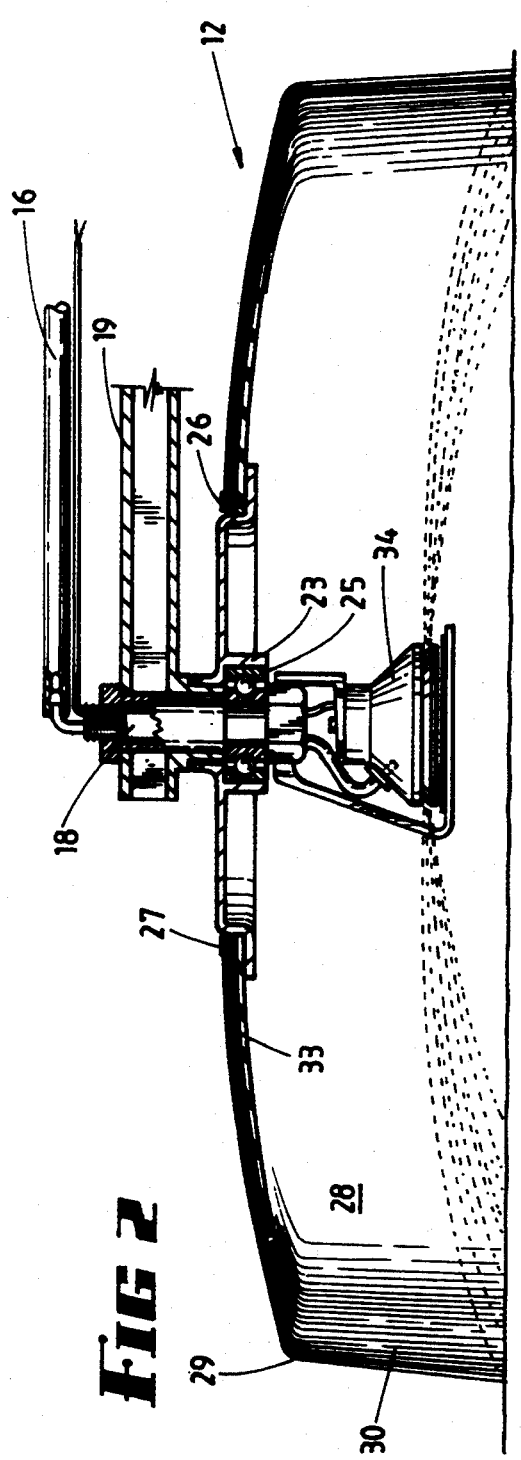
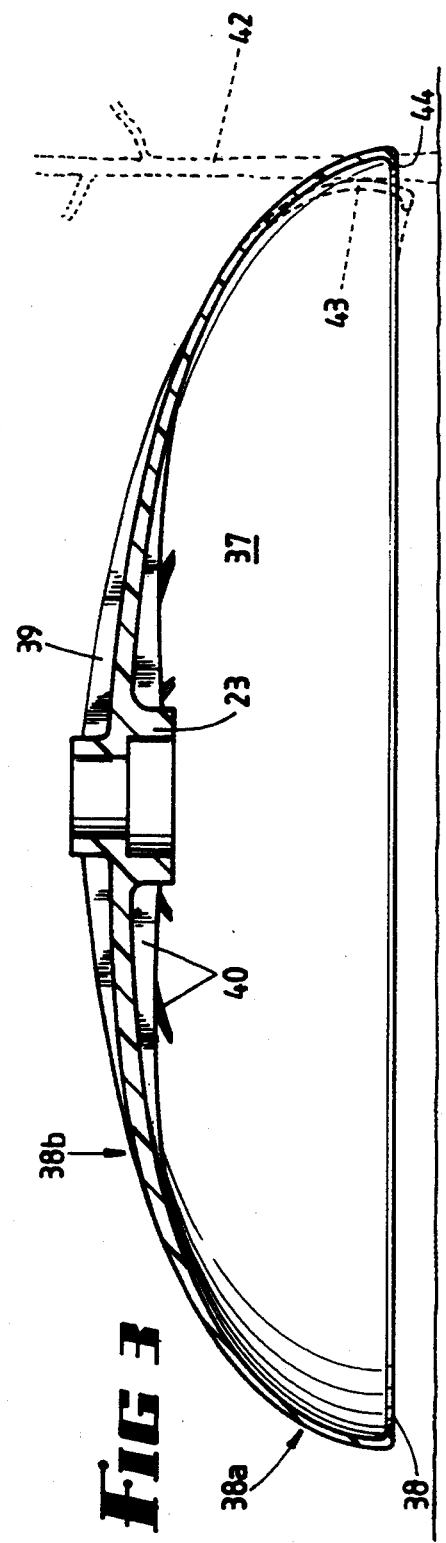

AGRICULTURAL CHEMICAL DISTRIBUTOR

This invention relates to a distributor which is useful for distribution low volumes of high concentrate chemical in agricultural applications, and is particularly useful for distributing herbicides while limiting overspray which might otherwise damage valuable plants such as grapes vines or orchard trees.

BACKGROUND OF THE INVENTION

It is already known that a fan jet type nozzle at one atmosphere of pressure will give about 45% of its number of droplets under 30 $\mu$m, and consequently when open spraying in agriculture, there is a general wastage of spray chemicals used for example for weedicide applications due to the droplets becoming airborne. Many weedicides are exceedingly effective, and for example the weedicide sold by Monsanto under the registered trade mark "ROUNDUP" can be effective when used in very small quantities. Hence overspray can be very damaging. However, it is known that droplets which exceed 400 $\mu$m will frequently bounce off foliage, and be wasted on the ground. For this reason, there has been much development into rotational spray devices which can give selective narrow ranges of droplet size from 50 to 300 microns, and wherein about 90% of the droplets fall in any one selected range (for example a range of 70 to 130 micron).

The British company CDA Ltd, of Lockinge, Wantage, Oxon, UK, distributed a pamphlet in October 1983 entitled "The Principles of CDA Spraying." Experimentation by the inventor herein has generally confirmed the information contained in that pamphlet to be the most accurate available to him. It compared conventional nozzle spraying with so-called "constant droplet application" (CDA) spraying which utilised a micro,spray head having spinner to produce droplets, and illustrated that a "conventional nozzle" which was tested, distributed some chemical in small droplets below 40 microns size (which was both wasted and damaging due to 'overspray'), and about one half the chemical was in droplets exceeding 150 microns, but included in a very small number of droplets.

This compared very unfavourably with a Constant Drop Applicator utilising a spinner, wherein only a small number of droplets were less than 35 microns, and none less than 15 microns, and none exceeded about 120 micron size. Most of the droplets were between 70 and 110 micron size, and accounted also for most of the chemical. Thus wastage was largely avoided, which would otherwise have been due to overspray of small droplets, and excessive quantities of chemical in large droplets.

The main object of this invention is to further enhance the advantages of using a CDA sprayer, and, if necessary enhance the use of a conventional sprayer, in both cases reducing wastage of chemicals due to wind losses or large droplets.

It is already known to provide a towable spraying device for attachment to a tractor to reduce the drift of finely misted particles of weedicide, and one example can be seen in the U.S. Pat. No. 4,186,879 in the name of KINDER, wherein a generally rectilinear shroud was provided with depending flexible baffles to comprise fore and aft wall sections of the shroud and engage and ride over rough terrain while still confining the spray within the shroud.

However, a sprayer must essentially be used under terrain conditions which vary widely. A rectilinear shroud must not be permitted to encounter such obstructions as a tree trunk or vine stem, since crop damage will otherwise ensue.

As far as is known to the applicant, a satisfactory provision has not heretofore been forthcoming to enable a towable device to spray weeds close to the stems of vines, bushes or trunks of trees, without endangering leaves, trunk or stem, and for example in the substantially rigid structure previously proposed, if carried too close to the trees or vines, there is a danger of the trunks or stems being damaged. In an extreme case, a sudden lurch due to engagement of the towed or towing vehicle with the walls of a plough furrow could conceivably result in destruction of a young plant.

The main object of this invention therefore is to provide improvements whereby it is possible to spray close to the stems of the vines, bushes or trees without endangering them either due to overspray reaching the leaves or in some instances reaching the green stalks or stems of the bushes or vines. It is a further object to inhibit loss due to wind drift so that a very fine mist of spray can be applied in minute quantities and yet be effective.

BRIEF SUMMARY OF THE INVENTION

In an embodiment of the invention, therefore, there is provided a freely rotatable shroud carried on bearings from a frame and being provided with a generally circular peripheral skirt of readily deformable material which is arranged to terminate close to the ground, the periphery being of sufficient diameter (at least ½ meter) that the shroud is readily rotated upon engagement with a stem or trunk of a vine, bush or tree without damaging same. The periphery may comprise a plurality of flexible bristles or strips of material depending from a periphery of a central annular portion of elastomeric material, and such an arrangement is useful for bushes or trees which are protected by sufficient bark that a small amount of spray which permeates the bristles or strips will not inflict damage. However, the invention is not limited to use of bristles because sometimes there is need for the invention to be applied to crops wherein the stems themselves have soft bark or are green (for example coffee, macadamia nuts or blueberries), and in another embodiment use may be made of a generally circular mushroom shaped shroud which is rotatable on bearings and which has a very flexible peripheral edge which is deformable when it encounters a stem or trunk of a bush, vine or tree in such a way that spray is deflected away from the base of the trunk but by only a very small distance (for example 20 to 30 mm). Such an arrangement overcomes difficulties which may otherwise be caused by penetration of the weedicide between the bristles or strips if comprised in a depending skirt.

With either of the above types of shroud, there is still a danger of an unexpected lurch of the towing or towed vehicles, and further it is necessary to provide sufficient rigidity to the rotatable shroud that it is dimensionally stable. In an embodiment of the invention the bearings are carried by means biased to be movable so that not only is a growing plant protected by the readily deformable skirt, but the entire shroud can be deflected bodily away from the trunk or stem of a tree, bush or vine, by a force small enough that the trunk or stem is not likely to be damaged, but the shroud can be returned to its normal path of travel by the biasing means, which can be a relatively light spring. Such an arrangement is a safety device and would not be operable under normal usage of the invention.

While it may be feasible for the mechanical requirements to be met solely by the swivelling of the arm to displace a shroud upon encountering a trunk or stem, such an arrangement is not favoured in this invention, since it would result in a concentration of weedicide on the approach side of a vine bush or tree, and an undesirable density reduction on the receding side, but by utilising a readily deformable shroud the speed of the spray head will be more nearly constant. A rigid shroud may also cause damage, for example to small plants, even if the spring loading is light.

Some weedicides are quite expensive and can inflict serious environmental damage if not contained, and an object therefore of this invention is to provide means whereby the usage of the chemicals can be much reduced, and this is achieved by the invention which enables a fine mist to be produced within the shroud but contained therein, and thereby allowing the shroud to be moved at much higher speeds through an orchard or vineyard than heretofore. A further advantage of the invention is that the equipment which is used can be of quite low cost, requiring no driving means to effect rotation of the shroud.

More specifically, in an embodiment of this invention there is provided an agricultural chemical liquid distributor having a frame comprising a fixed frame member, an assembly of a spray head within a shroud, the shroud having a generally circular peripheral skirt of deformable material, and a bearing supporting the shroud with respect to the frame for free rotation about a generally vertical axis, the shroud being of such size and configuration that passage of the distributor past an obstruction encountered by the skirt will cause deformation of said skirt material and effect said rotation of the shroud.

BRIEF SUMMARY OF THE INVENTION

An embodiment of the invention is described hereunder in some detail with reference to and is illustrated in the accompanying drawings in which:

FIG. 2 is a section through the shroud showing the bearings and support means of FIG. 1 but drawn to a larger scale;

FIG. 3 is a section similar to FIG. 2 but not showing the bearings, and illustrating a shroud wherein the deformable skirt is unitary with the central part of the shroud.

Figure 1:
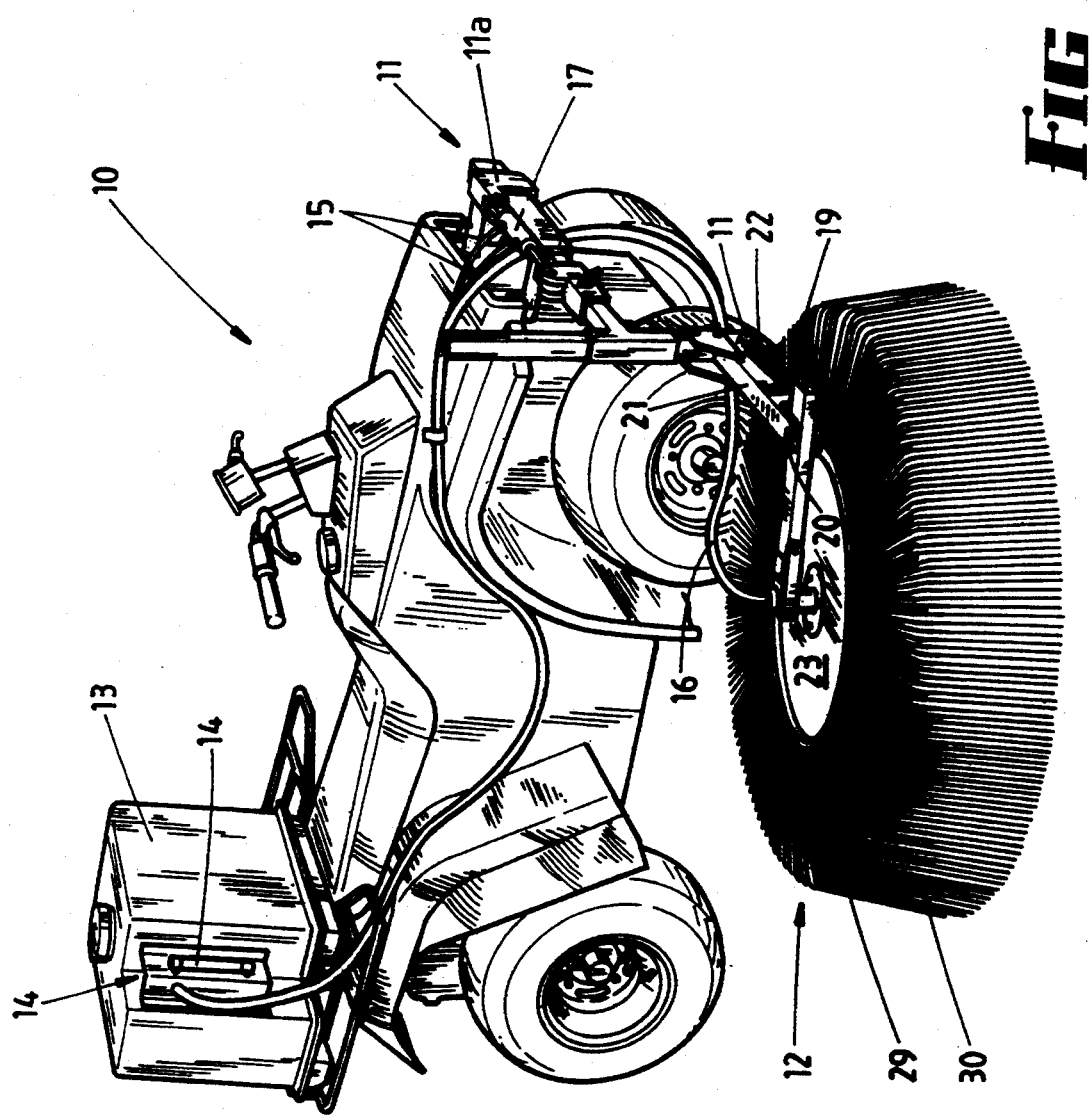
FIG. 1 is a perspective view showing a rotatable shroud carried by but laterally displaced from a motor vehicle.

In the first embodiment which is illustrated in FIGS. 1 and 2, a light weight motor vehicle 10 is provided with a frame member 11 carried thereto by a bracket 11a on a sleeve attached to the vehicle, in which the frame member 11 is adjustable for position, and can be used either left hand, right hand, or both, to support one or a pair of outrigger shrouds 12. Only one is illustrated. The vehicle 10 also carries on it a tank 13 or container of concentrated agricultural spray, and the tank 13 itself carries on it a subassembly 14 which includes a pump and flow meter for pumping the agricultural spray. Use may also be made of a second pump (not shown) for providing hydraulic pressure for positioning the shroud 12 laterally with respect to the vehicle 10. (The second pump may be the hydraulic pump of a tractor.) Electrical energy is also required for spinning a spray generating device but that only needs to be portion of the electrical equipment of the vehicle 10. Hoses 15 and 16 extend respectively to an hydraulic adjustment cylinder 17 (which is an optional device) and a spray conduit which extends through a hollow bolt 18 in the shroud 12. The cylinder 17 is operable to effect lateral adjustment of the position of the frame 11.

The shroud 12 is an assembly carried on one end of a swinging arm 19 which is pivoted at 20 to an outstanding portion 21 of the frame 11, and a tension spring 22 extends between an end of the arm to bias the arm 19 and frame 11. If only one of the hoses 15 extends to the hydraulic adjustment cylinder 17 so that there is hydraulic fluid on one side of the piston only in cylinder 17, the shroud assembly 12 can be deflected laterally but the arm 19 cannot pivot outwardly beyond a selected position depending on the amount of fluid introduced into the cylinder 17. This arrangement however is usually unnecessary except if the invention is to be used on very rough terrain.

In FIG. 1 the frame 11 is shown mounted on the front end of vehicle 10, but in many instances it may be mounted on the rear end. If vehicle 10 is a longer vehicle than shown, for example a tractor, frame 11 is best mounted beneath the tractor, and between the front and rear wheels so as to limit lateral movement of the outrigger shrouds when direction of travel is changed. Such an arrangement would commonly use two shrouds, one each side of the tractor, and positioned laterally by one cylinder 17.

Reference is now made to FIG. 2 wherein the shroud assembly 12 is shown to comprise a rigid boss 23 journalled to the hollow suspension bolt 18 through a bearing 25 so that the boss 23 is freely rotatable. The boss 23 may be of metal or rigid moulded fibreglass reinforced plastics, and terminates in an annular recess 26 which carries the supporting bead 27 of a length of brush 28 of the type which sometimes might be used on a road sweeper, bristles of brush 28 being kinked at 29 (by heat means) so that the depending skirt 30 extends downwardly from the kinks 29 to terminate near the ground over which the shroud is to traverse and the boss and bristles together define a downwardly oriented, concave shroud surface. It is desirable to use small diameter bristles because of their flexibility, and because they more effectively reduce overspray.

The inner portions of the bristles of brush 28 are supported by an annular elastomeric support ring 33 which in this embodiment is formed from flexible polyurethane, and the bristles extend outwardly beyond the periphery of ring 33 to the kinks 29.

In this embodiment, use is made of a CDA microspray head 34 contained within the concave surface of the shroud 12 and forming therewith a spray head and shroud assembly. The spray head shown was sold under the trade mark MICROMAX and now manufactured by the British company MICRON at 3 Mills, Bromyard, Herefordshire, England. These spray heads have the facility to produce a droplet size wherein most droplets lie in the range for spray conditions of 75 to 120 $\mu$m, and although spray heads can have a range capable of producing droplets as large as 400 $\mu$m, it is believed that droplets in excess of 300 $\mu$m are undesirable and that ranges of droplet size should be selected which do not emit droplets in excess of 300 $\mu$m. Careful selection of appropriate ranges is important in achieving optimum efficiency, and requirements will vary for different crops. FIG. 2 illustrates in dashed lines, a typical cross-section of a spray emanating from spray head 34.

In many instances, However, it is not necessary or even desirable to use the bristles of brush 28 and FIG. 3 illustrates a unitary moulding 37 of polyethylene wherein the wall thickness reduces towards the periphery 38 from the central boss 23, and in some instances additional stiffness is imparted between the boss 23 and an intermediate portion of the wall by a plurality of radiating stiffening ribs 39, radially extending corrugations 40, or both (as shown). Although the moulding 37 is a unitary moulding, its radially outer portion 38a can comprise a softer formulation of plastics material than its radially inner portion 38b, and thereby reduce need for the stiffening ribs 39 or the corrugations 40.

With the arrangement shown, the periphery 38 can be distorted (buckled) by quite a small stem 42 of a plant (for example a coffee plant) and when being deflected as shown at 43 in dashed lines, will provide a steeper surface for deflecting the micronic droplets of weedicide away from the base of stem 42 by a small amount, and even if tall growing grass is deflected outwardly from the space containing the micronic droplets, sufficient weedicide will contact the exposed grass within the space to be effective. Any condensate will run down the steeper inner wall at the deflected area onto the weeds growing adjacent the stem 42. By having a higher degree of stiffness in the inner portion of the shroud moulding 37 than at the periphery, buckling of the periphery where it encounters the stem may be confined to a small distance around the periphery, and experiments have shown that it is possible to reduce the weeds adjacent the stem 42 to an area approximately 50 mm in diameter. This can be done without the stem 42 encountering sufficient micronic droplets to damage the vine, bush or tree. The periphery can be plain, or, as shown, have an inwardly directed bead 44 which will limit the distortion length of a buckle. In some instances, the generally annular periphery 38 may include closely spaced inwardly formed depressions to still further reduce the distortion length.

Figure 4:
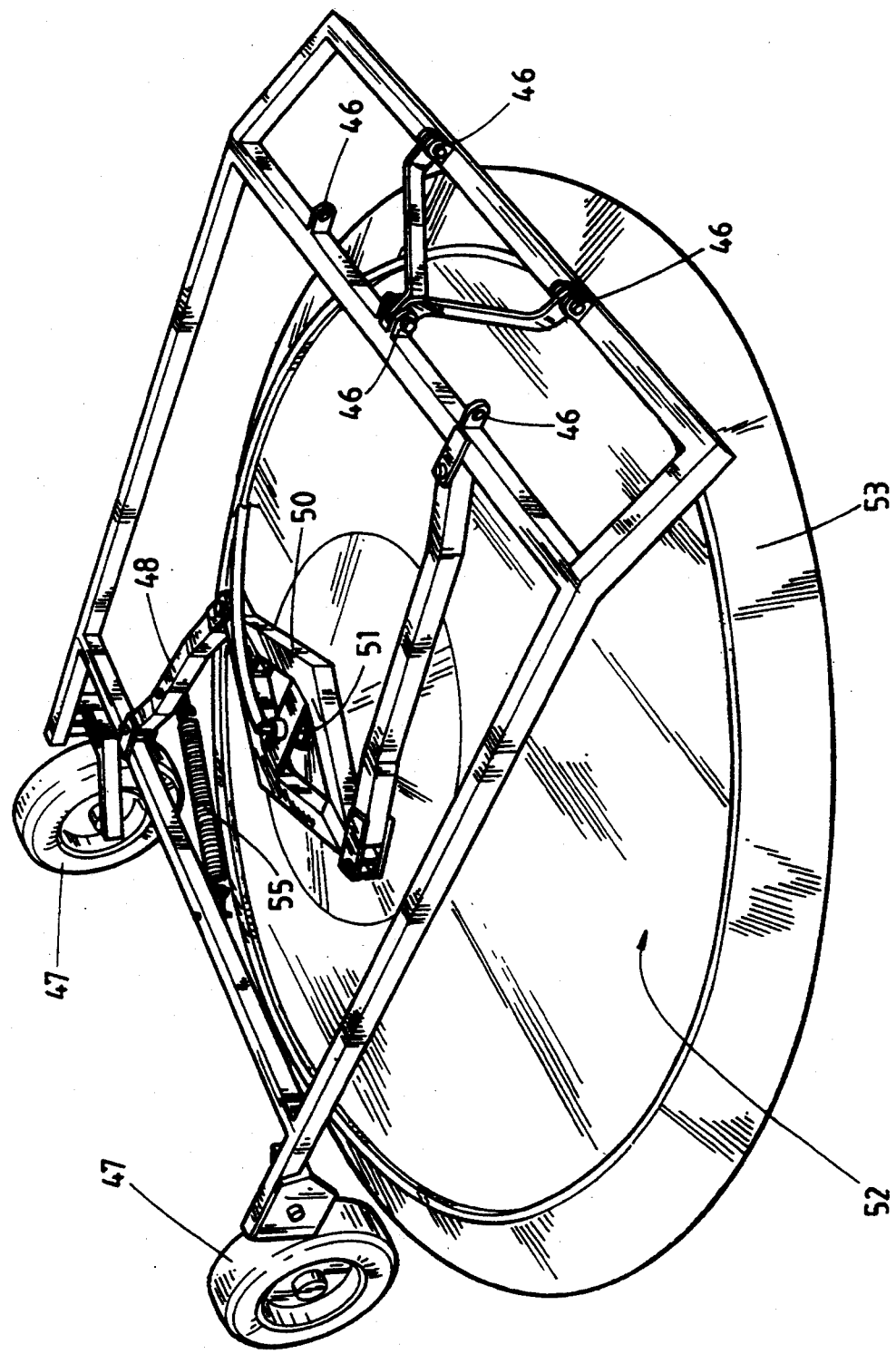
FIG. 4 is a perspective view of a larger diameter shroud with a deformable skirt, and carried on a frame which is readily displaced laterally.

FIG. 4 illustrates a slightly more expensive arrangement wherein a supporting sub-frame 45 is arranged with vehicle hitch lugs 46 for towing or for suspension by the arms of a three point linkage of a tractor as shown, the sub-frame 45 being supported at its rear end by trailing wheels 47.

There are two spaced swing arms 48, the swinging ends of which are intermediate the frame members of supporting sub-frame 45, and a central sub-frame 50 connects the swinging ends of arms 48. The central sub-frame 50 carries a bearing boss 51 which rotationally supports a steel dished disc 52. A skirt 53 of elastomeric material depends from the periphery of disc 52, and flares out radially and axially therefrom. An intermediate annular portion of elastomeric material may be interposed between disc 52 and skirt 53, as in the first embodiment. The large diameter of disc 52 effects a gradual transverse movement upon lateral deflection when skirt 53 encounters a stem or trunk. Return spring 55 is provided with adjustable tensioning means by varying its anchor point on frame 50 to compensate, for example, for the effect of sloping terrain. By simple relocation of the spring between the other arm 48 and the frame 45, the disc can function on the left hand side of the frame instead of the right hand side as shown.

Because the diameter of the shroud can be quite large (exceeding one meter) and its rotational inertia small, the amount of reaction force needed to cause rotation is so small that very little, if any, damage to growing plants occurs. The distortion, or buckling, of the periphery will occur over only a small portion of its circumference, in equipment made in accordance with the above embodiments and the periphery will return to its original shape once engagement with the object which caused the distortion or buckling terminates. Surprisingly large savings of weedicide have been achieved, even when substantial proportions of the chemical are of larger droplet size, up to 400 $\mu$m, but as said above, best results are usually achieved if the droplet size is between 75 $\mu$m and 110 $\mu$m.

Containment of small droplets below 75 $\mu$m by the shroud assists in avoiding damage to crops or environment.

The claims defining the invention are as follows:

1. An agricultural chemical liquid distributor comprising, in combination, a frame, a shroud supported by the frame and delineating a chemical distributing space and a spray head having an outlet, attachment means for attaching the frame to a vehicle, means supporting the spray head with its outlet within the shroud space, the shroud having a generally circular peripheral skirt of deformable material, and a bearing supporting the shroud with respect to the frame for free rotation about a generally vertical axis, the shroud being of such size and configuration that passage of the distributor past an obstruction encountered by the skirt will cause radially inward deformation of said skirt material and effect said rotation of the shroud.

2. An agricultural chemical liquid distributor according to claim 1 wherein said attachment means for attaching the frame comprises adjustment means for adjustment of said frame into position on a vehicle, with an end of the frame extending laterally and supporting said spray head and the shroud in an outrigger mode.

3. An agricultural liquid distributor according to claim 2 further comprising a swinging arm, a pivot connecting the swinging arm to a laterally extending end of the frame, and biasing means which bias one end portion of the swinging arm outwardly with respect to the frame, said bearing supporting said shroud from said swinging arm end portion.

4. An agricultural liquid distributor according to claim 1 wherein said shroud comprises a central boss which contains said bearing, and hollow suspension means depend from said frame and extend through said bearing to thereby support the shroud for its said free rotation, a liquid conveying conduit extending through said hollow suspension means and connected in fluid communication with said spray head, said spray head also being carried by said hollow suspension means.

5. An agricultural chemical liquid distributor according to claim 4 wherein said spray head is a micro-spray head capable of producing a spray wherein 90% of droplet sizes are within a narrow range which does not include a droplet size greater than 300 $\mu$m.

6. An agricultural chemical liquid distributor according to claim 4 further comprising a tank for containing said agricultural chemical liquid, a pump, a conduit joining the tank, pump and micro-spray head, and electrical wires connected to said head, said conduit and wires passing through said hollow suspension means.

7. An agricultural chemical liquid distributor according to claim 4 wherein said shroud comprises a plurality of bristles which extend radially outwardly and downwardly away from the central boss.

8. An agricultural chemical liquid distributor according to claim 4 wherein said shroud comprises a mushroom shaped unitary moulding of polymeric material which reduces both in thickness and resilience from said central boss to its periphery.

9. An agricultural chemical liquid distributor according to claim 4 wherein said frame comprises a supporting sub-frame, a central sub-frame, a pair of swinging arms each pivoted at one end to the supporting sub-frame and at the other end to the central sub-frame in a configuration which allows transverse movement of the central sub-frame with respect to the supporting sub-frame, a biasing spring between the sub-frames biasing the central sub-frame in one transverse direction, wheels supporting the mar end and vehicle hitch means at the front end of the supporting sub-frame, said hollow suspension means depending from the central sub-frame, said shroud having a relatively stiff central disc-shaped portion supporting said peripheral skirt.

10. An agricultural chemical liquid distributor according to claim 4 wherein the shroud diameter exceeds half a meter.

11. An agricultural chemical application mechanism comprising:

a) a frame including structure for connection to a vehicle for transport of the mechanism;

b) a shroud having a concave under surface delineating an applicator receiving space;

c) bearing means supportively interposed between the frame and the shroud for frame support of the shroud in freely rotatable relationship when the mechanism is in use;

d) the shroud including a resiliently deformable lower skirt means defining a portion of said under surface, the skirt means being inwardly deformable upon impact with an object thereby modifying the space and inhibiting chemical application onto such object and minimizing impact damage to such object, the skirt means being resiliently returnable to its pre-impact configuration upon termination of such impact with such object; and, e) a chemical applicator supportively connected to the frame and having an outlet disposed within said space.

12. The mechanism of claim 11 wherein the skirt means is comprised of a plurality of bristles.

13. The mechanism of claim 11 wherein the skirt means is formed of deformable molded plastic.

14. The mechanism of claim 13 wherein the skirt means includes an inturned lip for diverting the application of chemicals away from such object upon inward deformation from impact with such object.

15. The mechanism of claim 11 wherein the skirt means is further adapted to cause shroud rotation relative to the frame upon impact with such object.

16. The mechanism of claim 11 wherein the applicator is a spray head disposed within said space.

* * * * *